(12) United States Patent
Hillier

(10) Patent No.: US 9,757,918 B2
(45) Date of Patent: Sep. 12, 2017

(54) CERAMIC MATRIX COMPOSITE

(71) Applicant: ROLLS-ROYCE PLC, London (GB)

(72) Inventor: Steven Hillier, Manchester (GB)

(73) Assignee: ROLLS-ROYCE plc, London (GB)

( * ) Notice: Subject to any disclaimer, the term of this patent is extended or adjusted under 35 U.S.C. 154(b) by 271 days.

(21) Appl. No.: 14/196,751

(22) Filed: Mar. 4, 2014

(65) Prior Publication Data
US 2015/0251378 A1    Sep. 10, 2015

(51) Int. Cl.
| | | |
|---|---|---|
| B32B 5/02 | (2006.01) | |
| B32B 18/00 | (2006.01) | |
| C04B 26/04 | (2006.01) | |
| C04B 30/02 | (2006.01) | |
| B28B 1/00 | (2006.01) | |
| B28B 3/02 | (2006.01) | |
| B28B 23/00 | (2006.01) | |

(52) U.S. Cl.
CPC ............... *B32B 5/02* (2013.01); *B28B 1/008* (2013.01); *B28B 3/021* (2013.01); *B28B 23/0006* (2013.01); *B32B 18/00* (2013.01); *C04B 26/04* (2013.01); *C04B 30/02* (2013.01); *B32B 2262/105* (2013.01); *C04B 2237/38* (2013.01); *C04B 2237/64* (2013.01); *C04B 2237/76* (2013.01); *Y10T 428/24628* (2015.01); *Y10T 428/24669* (2015.01)

(58) Field of Classification Search
CPC .... B32B 3/02; B32B 3/06; B32B 3/26; B32B 3/30; B32B 18/00; B32B 5/02; B32B 1/00; B32B 2262/105; C04B 35/00; C04B 2237/64; Y10T 428/24694; Y10T 428/24711; Y10T 428/24628; Y10T 428/24669

USPC ...................... 428/179, 182, 184, 192, 293.4
See application file for complete search history.

(56) References Cited

U.S. PATENT DOCUMENTS

| | | | | |
|---|---|---|---|---|
| 2009/0252907 | A1* | 10/2009 | Keller | ................ B32B 18/00 428/34.6 |
| 2010/0291348 | A1 | 11/2010 | Morrison et al. | |
| 2010/0291349 | A1 | 11/2010 | Merrill et al. | |
| 2013/0071628 | A1* | 3/2013 | La Forest | ............... C04B 35/83 428/184 |

FOREIGN PATENT DOCUMENTS

| | | |
|---|---|---|
| GB | 1 440 184 | 6/1976 |
| JP | A-10-17377 | 1/1998 |

OTHER PUBLICATIONS

Aug. 14, 2013 British Search Report issued in British Application No. 1303999.5.
May 27, 2014 European Search Report issued in European Application No. 14 15 7653.

* cited by examiner

*Primary Examiner* — Catherine A Simone
(74) *Attorney, Agent, or Firm* — Oliff PLC

(57) ABSTRACT

The invention concerns an article (20) formed of a ceramic matrix composite structure having a plurality of ceramic fiber layers (22) and a binder material (24) interspersed throughout said layers. The ceramic matrix composite material may be sintered. The ceramic fiber layers undulate relative to one or more outer surfaces (38;40) of the article. Thus support features (48) within the article are able to share a load in use between a plurality of layers. The invention may be suited to engine components such as turbine seal segments in a gas turbine engine.

26 Claims, 3 Drawing Sheets

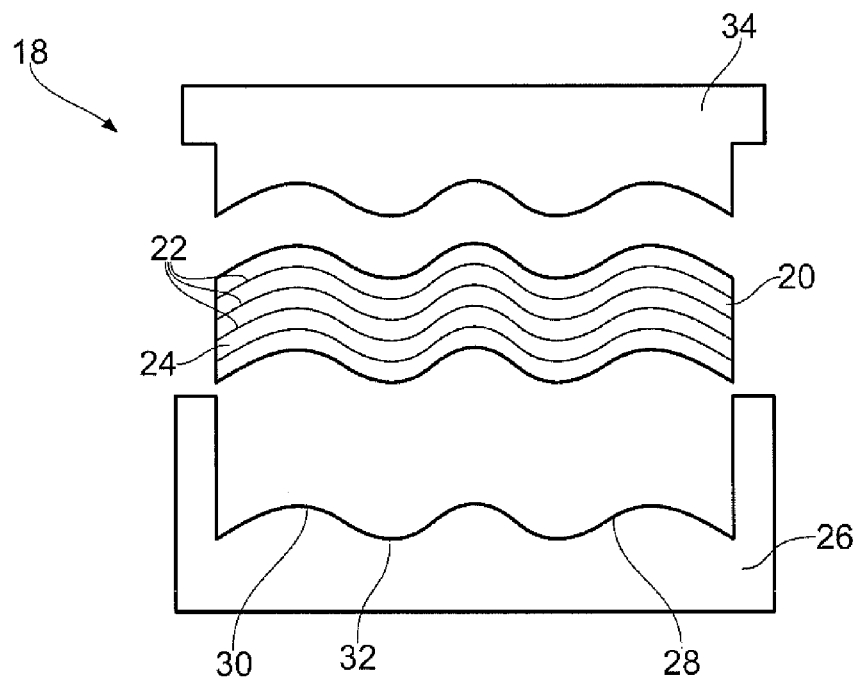
FIG. 3
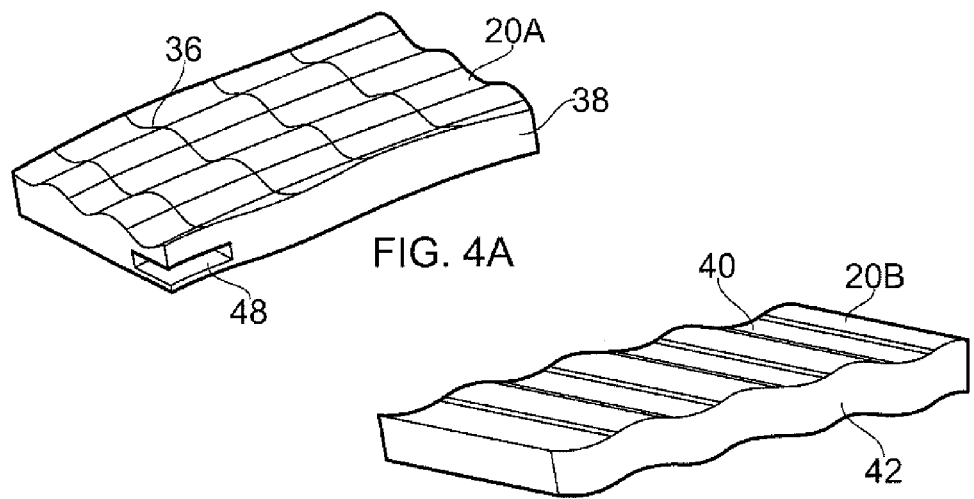
FIG. 4A
FIG. 4B

CERAMIC MATRIX COMPOSITE

BACKGROUND

The present invention relates to ceramic matrix composites and more particularly, although not exclusively, to products formed from such composites by sintering.

Ceramic Matrix Composites (CMC) are often used, for example in aerospace applications, where components are required to withstand high temperatures. For many such CMC components, a woven fabric comprising ceramic fibres is typically provided as a generally two-dimensional sheet or layer. A plurality of such layers are stacked within the final component.

For sintered CMCs, a matrix material binds the layered fibre structure both during forming and also after sintering. In forming a desired product, the woven material is doused in the matrix material and successive layers are built up to the desired depth. Depending on the form of the product to be produced, the layers may be laid flat or applied over a male or female mould such that the layers are generally parallel with the contour of the outer surface of the product.

The make-up of the matrix material and woven fabric as well as variations in the applied pressure and temperature to sinter the structure can be used to generate the desired mechanical properties of the end product. In this manner it is possible to achieve varying levels of fibre volume fraction and matrix densification in the final product, which impacts, for example, on tensile strength, bending strength and damage tolerance.

SUMMARY

One primary reason for using CMCs over monolithic materials is their damage tolerance (i.e. crack resistance). This beneficial property occurs since the sintered matrix contains a distribution of micro-cracks throughout its structure which can open and close upon loading without propagating into a larger-scale brittle fracture due to the presence of the fibre structure. However such properties are highly directional and can result in CMC's being unsuitable in the event that a component is required to undergo loading in multiple directions.

In the example of FIG. 1, there is shown a component 2 having a recess 4 or other re-entrant feature, such as a slot, which bears a load in a direction 6 perpendicular to the plane of the fibre layers 8. In such a configuration the load 6 acts on a single interlaminar join between the layers 8A and 8B, which offers a significantly reduced tensile capability and can lead to failure of the component in the vicinity of the line 10. This property makes conventional CMC's unsuitable for many applications in which components are loaded in multiple directions or else which have support formations in the form of hooks, flanges, recesses or the like arranged to bear substantial loading in use. Such problems can be heightened for components which undergo thermal loading in high temperature environments.

One proposed solution is to provide an alternative woven matrix, using so-called 2.5D or 3D weaving techniques, in order to provide fibres bridging the laminae within the product. However such techniques are currently limited in the range of component shapes that can be accommodated. Another approach to the problem is to design a product to share the interlaminar loading between a plurality support features, rather than any one interlaminar joint. However the freedom of design can be limited for components which are intended for use within an assembly since any changes will impact on other components of the assembly. Even where it is possible to redistribute loads in this manner, the interlaminar tensile strength is often so low that the provision of two or more load-sharing features may still be insufficient to bear the operational loads.

It is an aim of the present invention to provide an alternative ceramic matrix composition and a corresponding method of manufacture which can provide improved load bearing characteristics.

According to the present invention, there is provided an article as defined in the appended claims.

The article is formed of a ceramic matrix composite having a plurality of ceramic fibre layers, and a binder material interspersed throughout said layers, wherein the ceramic fibre layers undulate relative to one or more outer surfaces of the article.

The product may comprise a substantially solid body comprising said ceramic matrix composite. The ceramic fibre layers may undulate through at least a portion, or else the whole, the body with respect to at least one outer surface. The undulating ceramic fibre layers may extend between opposing outer walls of the article. The undulating ceramic fibre layers may extend through an entire width, length or other dimension of the article. The article may further comprise a load bearing formation having a load bearing surface which intersects on or more of said layers such that a load applied to said surface in use is shared between a plurality of layers.

The article may have one or more outer surfaces which are substantially flat or planar in form. Additionally or alternatively one or more outer surface may be curved or arcuate in form, but with a profile which differs from that of the undulations of the ceramic fibre layers.

The amplitude of the undulations may be at least equal to the distance between adjacent layers. The amplitude of the undulations may be greater than or equal to the depth of one or more layers. The amplitude may be a peak amplitude or else a measure of the height variation between the peak and the average or mean height of the undulation. The undulations may be such that adjacent layers overlap or interfere. That is to say the maximum height of one layer may be greater than or equal to the minimum height of an adjacent layer.

Such a feature is beneficial in that it is not possible to take a planar or curved section through the product without crossing one or more layers. This helps to ensure that any loading of the product in use, even in a direction perpendicular to the layers will be shared by a plurality of layers. To this extent, any inter-lamina loading, such as tension or shear, will be shared by the plurality of layers. This arrangement serves to limit the extent to which any crack can propagate through the body of the product.

The undulations may beneficially serve to resolve any tension or shear forces applied to the product in use.

The amplitude of the undulations may be two or more times the depth of, or distance between, the layers. Each layer may overlap, or interfere with, a plurality of layers. That is to say each layer may have a maximum height which is greater than the minimum height of an adjacent layer, or a plurality of layers.

The undulations may be regular and repeating through the article. The undulations may be cyclic and may be substantially sinusoidal in profile. Any, or any combination, of the layers may be substantially parallel or aligned. Any, or any combination, of the layers may undulate in phase. In one embodiment, adjacent layers undulate in phase.

The binder material may comprise a fused ceramic matrix material. The blonder material may be sintered.

At least one outer surface of the article may intersect one or more of the undulating ceramic fibre layers, typically the outermost one or more layers. The outer surface may intersect one or more layers at a plurality of locations. The outer surface may intersect one or more layers in a regular, repeating pattern over its area. The outermost one or more layers in the vicinity of said surface may thus comprise an incomplete or partial layer.

The layers may extend in a global direction which is substantially parallel to the outer surface. For example, each layer may undulate relative to a plane which is substantially parallel to the outer surface. That plane may be obliquely angled or perpendicular to at least one further surface of the article. The further surface may be a surface of a load-bearing portion of the article in use such as a supporting bracket or flange.

The article may comprise an outer surface coating layer. The article may comprise a plurality of coating layers. A coating material may over lie or fill any undulations in the composite material surface.

The product may comprise one or more hook or flange formations for mounting of the product in use, for example within an assembly. Any such formations may comprise the undulating ceramic fibre layers.

The undulations may vary in height in one dimension only. In such an embodiment the undulations may form a series of elongate generally parallel troughs or valleys through the product. Alternatively the undulations may vary in two-dimensions, for example, so as to for a two-dimensional array of discrete peaks.

Also provided is a method of manufacturing a ceramic matrix composite article, comprising: providing a plurality of ceramic fibre layers; interspersing a binder material throughout said layers; applying an undulating pattern to said layers; and heating the layers and binder material so as to fix the undulating patter of the layers with respect to an outer surface of the article once formed.

The method may comprise machining the outer surface. The method may comprise forming an undulation in the outer surface of the product and subsequently machining the outer surface to remove or modify said undulation. The outer surface may be machined and/or filled such that it is at least in part planar. The outer surface may be machined such that it curved, the curvature of which differs to that of the layer undulation. The outer surface may be machined to provide a plurality of adjoining outer surface portions which may be any, or any combination of, planar or curved.

The machining may comprise machining one or more support formations or load-bearing formations in the article. Such formations may comprise flange, bracket or similar formations. The load-bearing formation in use may comprise a fluid washed surface of the article. The machining may comprise machining a plurality of support or load-bearing surfaces which are obliquely or perpendicularly angled.

The forming may comprise moulding. The forming may comprise laying a plurality of the layers within a mould. One or more walls of the mould may comprise one or more undulation in order to provide the desired undulating pattern in said layers. The layers may be laid on, or substantially parallel to, said mould wall. A pair of opposing mould walls may comprise said one or more undulation. The layers and binding material may be located between said opposing walls. The mould may comprise one or more further walls which may be planar inform.

Pressure may be applied to the layers and binder material during formation of the article. The heating may comprise sintering.

The binder material may comprise a ceramic particulate material. The binder material may comprise a fluid binder or carrier material. The heating of the binder material may fuse the ceramic particulate in the binder material. The heating may drive liquid out of the fluid binder or carrier material. Two or more heating stages may be undertaken, for example as separate or successive heating stages for the purpose of driving off liquid phase material and fusing or sintering the particulate material respectively.

Any, or any combination, of the optional features defined in relation to the first aspect may be applied to the second aspect, and vice versa, where practicable.

In any aspect, the article may comprise an engine component or an aircraft or spacecraft component, such as a component for a gas turbine engine. The article may comprise a seal segment such as a rotor seal segment or other component for assembly in an engine, such as a heat shield or similar.

The present invention can provide a modified fibre layup for a ceramic matrix composite which allows such materials to be used in applications for which the material characteristics of ceramic matrix composites in tension have been hitherto deemed unsuitable.

BRIEF DESCRIPTION OF THE DRAWINGS

Workable embodiments of the present invention are described below in further detail with reference to the accompanying drawings, of which:

FIG. 3 shows a schematic section view through a mould during manufacture of a component according to one example of the invention;

FIGS. 4A and 4B show partial section views through two composite material arrangements according to examples of the invention;

DETAILED DESCRIPTION OF THE EMBODIMENTS

Figure 2:
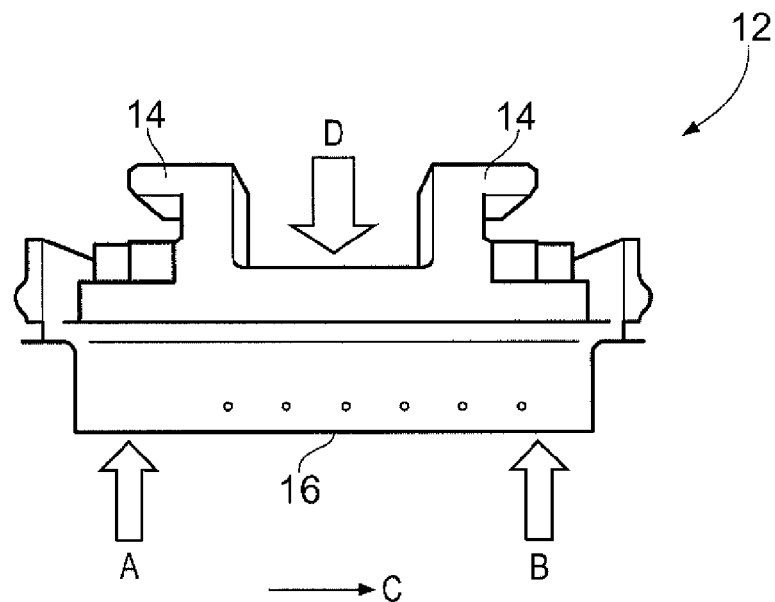
FIG. 2 shows an end view of an exemplary article to which the present invention may be applied.

Turning to FIG. 2, there is shown an exemplary article to which the present invention may be applied. The article takes the form of a turbine seal segment 12 for a gas turbine engine. Such articles are typically required to withstand high temperatures in use, such as temperatures in the vicinity of, or exceeding, 900° C. or 1,000° C. However it will be appreciated that composites according to the invention may also be used in relatively lower temperature environments, such as in the range 500-900° C.

In use, the seal segment 12 is mounted to a support formation (not shown) by hook formations 14 on the rear face of the component. A plurality of seal segments are provided in a side-by-side configuration in this manner to provide an annular sealing ring about a common axis, so as to closely surround a turbine in use.

A first surface 16 of the seal segment 12 is exposed to hot gas downstream of a combustion chamber in use. The surface 16 is generally planar in form, although it typically has a slight curvature to closely accommodate the radius of the turbine about which it is mounted. The hot combustion products are pressurised such that the seal segment 12 experiences a load on surface 16 in the direction of arrows A and B in use. The surface 16 faces generally inward towards a turbine axis such that the fluid pressure acting on the surface 16 is generally radial (i.e. perpendicular to the surface 16) in direction.

The rotating turbine blades pass the seal segment 12 in use in a direction into, or out of, the page in FIG. 2 and may thus cause a pressure differential across the gas washed surface. The pressure loading at arrow A (i.e. to one side of the segment) is larger than the pressure loading at arrow B (i.e. at the other, downstream side of the segment) with the passage of gas in the direction of arrow C, such that the segment 12 may also accommodate internal stress in use.

The segment is also cooled in use by a high pressure coolant flow which applies a fluid pressure to the rear of the segment generally in the direction D. The pressure differential between the front and rear sides of the component may be in the vicinity of for example 100-300 Psi, resulting in a net loading in the direction D.

Figure 1:
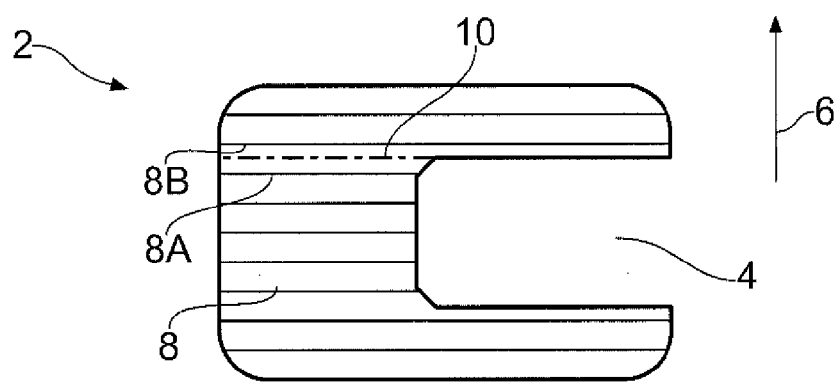
FIG. 1 shows a section through a ceramic matrix composite article according to the prior art.

It will be appreciated that the loading on the segment in use is thus multi-directional, or complex, in nature. However the component of the loading in the direction of arrow D must be resisted at least in part by the hooks 14 in tension. It can be seen that the hooks 14 have an upstanding wall and an end wall or abutment formation which is generally parallel to the gas washed surface 16. Thus the loading of the hooks in the direction of arrow D at the elbow or corner of the hook and cause a force equivalent to that described in relation to FIG. 1 above.

Such complex loading has meant that ceramic matrix composites have provided unfavourable results for conventional composites having a generally flat fibre layer layup in the direction of surface 16, despite being able to offer beneficial thermal properties. In particular, the pressure loading in the direction of arrow D is applied though a single ply-to-ply or interlaminar joint and, with only the sintered matrix material holding the two plies together, the joint can be easily overloaded and fail. Typically the inter-laminar tensile (ILT) capability for a product of this kind is in the region of 6 MPa. The provision of more than one hook, for example one at each corner of the component, will share the load but it has been found that such shared loading may still exceed the ILT capability and, accordingly, that a conventional ceramic matrix composite may not suitable to accommodate the pressure differences found in this, and other, gas turbine engine applications.

Whilst the present invention has resulted from an analysis of possible solutions to this problem in particular, it will be appreciated that the invention is applicable to other moulded ceramic composite components or products which experience multi-directional loading in use. Particular applications for such technology include the use of CMC's to withstand high temperature conditions, where the CMC component is required to be assembled within a larger, typically metallic, structure.

Turning now to FIG. 4, there is shown a schematic mould 18 and a section view of a moulded component 20 formed therein. The component 20 is formed of a plurality of fibre layers 22 in the form of plies bound within a solidified matrix material 24 interspersed throughout the layers 22.

The fibre layers comprise textile layers formed of ceramic fibres. In this example, commercially available ceramic oxide fibres are used, which may comprise crystalline oxide fibres, such as Nextel 610 or 720 fibres sold by 3M. Those fibres provide preferable high temperature structural characteristics, although other commercially available oxide fibres, including polychrystalline oxide fibres, may be used dependent on the working environment of the final component.

The ceramic fibres are bunched together to form a tow and the tows are woven in to a cloth (or sheet). Various different weave patterns are possible depending on the desired properties of the textile. In the present example cloth has eight tows of fibres in the X direction and one tow in the Y direction, typically referred to as an eight harness satin weave, which provides good directional properties.

The matrix material binds the CMC structure together both during forming (pre-sintering) and in use (post-sintering). The matrix material is provided in the form of a slurry consisting of a binder (such as a PVA binder), water, Alumina and Silicate media. The matrix slurry comprises a particulate material(s) in suspension which is worked into the textile such that the particulate material is present within and between the ceramic fibre layer makeup.

Each woven textile layer 22 is covered in the ceramic matrix slurry such that the solid Alumina and Silicate particles surround the fibres. The individual layers, once saturated with the matrix material, are stacked by laying each ply one on top of the other in a generally common alignment until the desired material thickness or depth is achieved. In this regard, each ply is separate to the adjacent plies in that no fibres bridge the layers and thus the layers are held at this stage merely by the viscosity of matrix material.

As shown in FIG. 3, the textile layers are laid on a profiled mould member 26. The mould member 26 has an undulating contact surface 28. The contact surface undulates in a regular repeating wave form so as to define a contoured pattern of peaks 30 and troughs 32. The malleable, viscous nature of the layered textile-and-matrix composition allows the composition to conform to the contour of the contact surface when laid thereon. Accordingly the layers 22 are laid in an orientation which is substantially parallel to, or aligned with, the undulating contact surface 28.

In this manner a desired lay-up of the ceramic matrix composite can be achieved. However in the event that further conformance of the composite structure to the desired profile is required, a further mould member 34 can be provided and pressed into contact with the composite. The further mould member 34 opposes the mould member 26 such that the composite structure 20 is sandwiched between the opposing mould members. The further mould member 34 also comprises an undulating contact surface which corresponds to the contour of the contact surface 28 so as to apply a common undulation to the opposing side of the composite structure between the mould members.

The opposing mould members are pressed together so as to apply a compressive force to the composite structure 20 there-between. Additionally or alternatively, compression can also be applied to the composite structure using conventional sintering techniques. The compression of the structure 20 forces the solid particles in the matrix slurry to come into close contact or proximity.

The composite structure is heated in a compressed and/or moulded state. In this example, two stages of heating are undertaken. The first heating stage involves raising the temperature so as to remove water from the matrix such that the PVA binder of the matrix material locks the structure into place. After this first heating stage, the composite structure is a so-called 'green' form, in which the structure is self supporting and can be handled without altering the form of the structure or the arrangement of the layers therein.

The composite structure 20 is put into a furnace and slowly heated initially up to approximately 100° C. to drive off any residual moisture.

The structure is then sintered by increasing the temperature to at least 1100° C., and maintaining that temperature for a period of time. This causes atomic diffusion between the adjacent particles within the matrix material, thereby fusing the particles together to form a single solid body. Varying the pressure and temperature of the processing allows control of the degree or level of densification and or fibre volume fraction in the final product. Those properties can thus be tailored to generate the desired resultant mechanical properties of the component.

Within the sintered body 20, the solid matrix material is bonded together and has an even distribution of microcracks throughout it structure. The matrix material also adheres to the fibre layers to, although the interface between the fibres and the matrix is generally weaker in order to provide the desired composite behaviour. A composite structure of this kind is advantageous since such micro-cracks can open and close as the component is loaded in use but which cracks are inhibited from propagating into larger defects or voids by the presence of the reinforcing fibre structure. The composite material is generally notch insensitive, unlike a monolithic sintered material which can exhibit a brittle failure from a small surface defect or scratch. The temperature capability of a CMC produced in this manner is typically at least 1,100° C. for continuous use, but may intermittently be exposed to temperatures of at least 1200° C.

Examples of different body shapes 20A and 20B which may be formed according to the method of the present invention are shown in FIGS. 4A and 4B.

In FIG. 4A, the composite body 20A has major opposing faces 36, over which an undulating surface profile is provided. The intermediate surfaces 38 extending between the major opposing faces 36 are generally flat or planar in form. The undulating profile of major surfaces define a series of peaks and troughs in the surface arranged between opposing sides or edges of the component. In this embodiment the peaks and troughs are unidirectional in that the surface undulates in a first direction but the peaks and troughs are continuous or uniform in a second, perpendicular direction.

In the example of FIG. 4B, the composite 20B has opposing major surfaces 40 which are generally flat or planar in form. The undulation in this embodiment is applied to intermediate or side surfaces 42 of the composite body. Accordingly the undulating textile layers in this embodiment extend in a direction which is perpendicular to the major faces of the body (i.e. across the width of the body).

In either embodiment, the undulation may be applied to a first and/or second surface and the one or more further surfaces, which may be perpendicular or otherwise angled thereto, are planar or flat in form. It will be appreciated that the further surface(s) may also be curved in form if the geometry of the component so requires. However the curvature of those surfaces will typically differ from the undulation of the first and/or second surfaces. Also the further surfaces may have features formed therein as permitted by conventional moulding techniques, such as projections or recesses formed according to the shape of the mould used.

In any of the above described embodiments, an undulation is applied to all the reinforcing textile layers 22 within the body which corresponds to the undulation of the surface of the component, with which the layers are aligned. Thus the textile layers undulate according to a regular repeating wave form throughout the body of the product. Those undulations may take the form of, for example, a sine wave.

Figure 5:
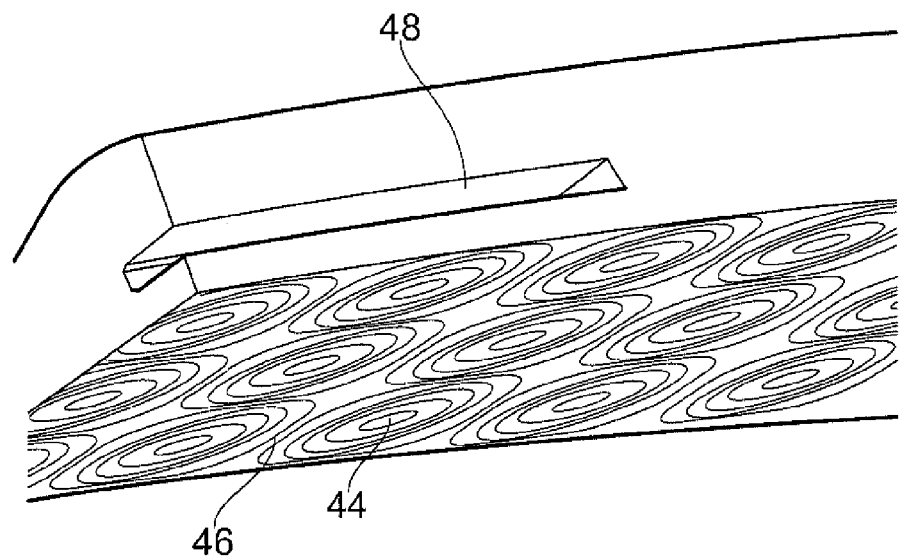
FIG. 5 shows a negative of the interior of an article during manufacture according to the present invention; and, FIGS. 6A and 6B show respective schematic side and front views of a component according to one example of the invention with layer contours superimposed.

An alternative example of undulation is shown in FIG. 5, in which the textile layers vary in height in a bi-directional manner. In this Figure, a negative of a composite body is shown but with a view of the end face, or section, of the body. In this example the undulation or wave form of the layers varies in two-dimensions so as to form a two-dimensional array of peaks 44 spaced by a network of intervening troughs 46.

As can be discerned from any of the above embodiments, each layer within the body undulates with respect to a plane or planar section through the body. That plane may be considered to be the average or datum plane for the layer. Thus, if one takes that planar section through the body, it will cross or intersect the same layer a plurality of times.

Furthermore if the amplitude of undulation of the layers (and the corresponding mould used to form the body) is greater than the spacing between the textile layers, then the plane will cross or intersect a plurality of the textile layers. For example if the amplitude of the undulation (i.e. the difference in height between the maxima (or peak) and minima (or trough) points in the undulation) is equal to three times the distance between adjacent layers, then the planar section through the body will cross three layers within the body. The relationship between the number of layers crossed by the planar section and the amplitude of undulation is therefore linear. In the example of FIG. 5, it can be seen that a plane through the component intersects with five different layers.

The inventor has determined that this feature can be used to distribute, typically tensile, loading on the body between a plurality of layers. An example of such an advantage is particularly applicable with respect to FIGS. 4A and 5, each of which have a re-entrant feature in the form of a slot 48 formed in a side wall of the CMC body. It is to be noted that those articles are simplified examples from an intermediate component during processing of a final component.

Figures 6A, 6B:
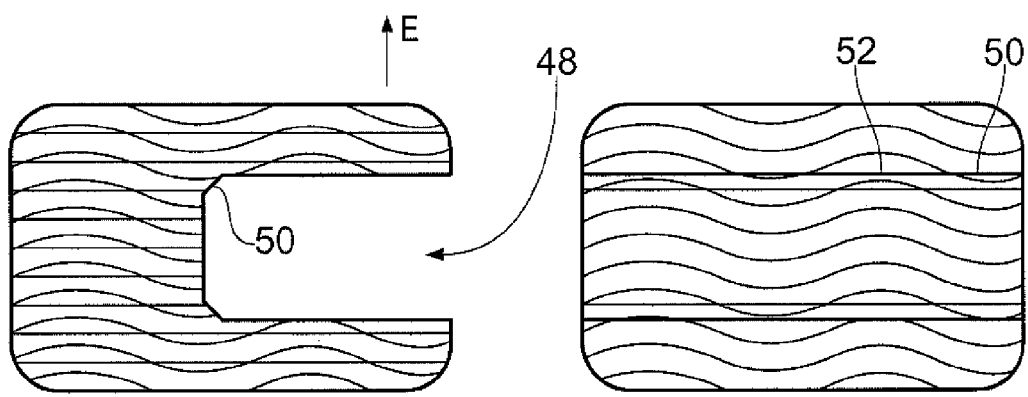

A simplified, schematic view of the slot 48 is shown in section in FIG. 6A and in plan in FIG. 6B. In this example, a bi-directional undulation of layers is provided. It can be seen in FIG. 6B that the internal corners 50 of the slot intersects the textile layer 52 and therefore any tensile loading on the slot, for example in the direction of arrow E which is perpendicular to the datum plane for layer 52, is shared between the matrix material of two adjacent layers. Thus the component of the load borne by any one layer is halved. Also the undulation of the layers may serve to resolve the tensile load. In this manner a perpendicular inter-layer tensile force is resolved to a partial inter-layer shear force and only a component of the tensile force is borne by the matrix material in direct tension.

Turning back to FIG. 5, it can be seen that the slot intersects five different textile layers within the body and thus any tensile load applied to the slot is effectively shared between the matrix material between six adjacent plies of the composite structure.

The undulating lay-up of the textile layers can be used in this manner to reduce the inter-lamina loadings on a CMC component to acceptable levels. By varying the amplitude and frequency of the wave a number of fibres a CMC material can therefore be tailored for use under loading conditions in which conventional CMC layups would fail. In the present example, the inter-laminar loading can be reduced to below 6 MPa such that CMC materials can be considered to be viable for the application at hand.

As an additional advantage, the CMC material according to the present invention can be achieved using established manufacturing techniques, requiring only the modification of the shape of the mould to accommodate the undulation of reinforcing ceramic textile layup. For example the profiling of the CMC body can be achieved using a vacuum bag in a conventional autoclave or press with the addition of a pre-form or mould insert shaped to provide a contact surface as described above.

In a final component produced according to the invention, the undulation in the outer surfaces of the component can be modified so as to present a desired external contour which may be planar or else alternatively profiled as required for assembly of the component in a larger structure. This modification can be achieved using one of a number of conventional machining processes. In FIG. 5, it can be seen that if the lower outer surface of the component is machined in line with a datum plane, then the outer surface will intersect with the fibre layers. Thus the cut or severed edges of the fibre layers will be present at the surface of the component. Whilst this may be acceptable for some application, it may be desired to further process the outer surface of the component.

The outer surface of the component, whether or not it is machined, can be treated or coated using conventional techniques in order to achieve the desired surface properties, for example to provide a suitable interface with a connecting component. In one embodiment, a flat plate member is bonded to the outer surface, which may be further coated to provide a desired surface finish.

In other embodiments it is possible to apply a coating material to the wave form in the outer surface as moulded. The coating could be applied to fill the troughs in the wave form, such that the coating varies in depth over the area of the outer surface and thereby provides a planar outer surface for the component. Also, combinations of machining and coating are also possible to provide a desired surface finish.

In further examples of the invention, it will be appreciated that the mould may take a more complex male and/or female mould form according to the desired geometry of the product.

For some examples of the invention it may not be necessary to continue the undulation of the layer throughout the entire width, length and/or depth dimension of the component. Instead the undulation may only be provided in a portion of one or more layers. In such examples, a corresponding mould surface may comprise an undulating portion and a non-undulating portion.

As a further development of the invention, the undulation in the outer surface of the component could be beneficial in some applications. For example, in the case of a turbine seal segment, the gas washed surface is often intended to be rubbed by the passing turbine blades so as to wear the surface in situ and thereby provide the minimal blade clearance. An undulating surface in this scenario may beneficially provide for a surface which can more easily and readily be worn by the passing blades, for example by wearing away the peaks of the undulating surface profile.

Whilst the above description relates to the provision of support formations within a CMC body, such as slots, flanges, integral bracket formations or the like, it will be appreciated that the above techniques can be applied to any CMC component in order to provide a greater tensile loading capacity.

The present invention allows CMC materials to be mounted and used within a larger assembly, typically comprising a metallic structure. This allows the benefits of CMC materials, such as their high temperature capability and a reduction in cooling air requirements, to be used to improve product performance in a greater range of applications. For example, the invention allows a conventional hook and bird-mouth type geometry to be used to mount the CMC to a metal support structure.

The invention claimed is:

1. An article having a load bearing formation including a load bearing surface arranged, in use, to be subjected to a tensile load, the article comprising:
   a ceramic matrix composite structure having a plurality of ceramic fibre layers, and a binder material interspersed throughout said layers,
   wherein the ceramic fibre layers are arranged in parallel and each undulate relative to a datum plane, the datum plane extending orthogonal to the tensile load, such that the tensile load applied to the surface is shared between a plurality of the layers.

2. An article according to claim 1, wherein the load bearing surface of the article is aligned with said datum plane.

3. An article according to claim 1, wherein the undulating ceramic fibre layers extend through an entire width, length or depth dimension of the article.

4. An article according to claim 1 comprising a solid body consisting of said ceramic matrix composite structure.

5. An article according to claim 1 wherein the load bearing surface is substantially planar in form.

6. An article according to claim 1 wherein the amplitude of the undulations is greater than or equal to the distance between adjacent layers.

7. An article according to claim 1 wherein the amplitude of the undulations is greater than or equal to the distance between a plurality of said layers.

8. An article according to claim 1 wherein the layers undulate in phase, and wherein a peak in the undulation of one layer extends between adjacent troughs in the undulation of at least one further layer.

9. An article according to claim 1, wherein the undulations repeat in a regular pattern through the article.

10. An article according to claim 1, wherein the layers undulate in two-dimensions.

11. An article according to claim 1, wherein an outer surface of the article intersects one or more layers at a plurality of locations over said surface.

12. An article according to claim 1, wherein the binder material comprises a sintered ceramic matrix material.

13. An article according to claim 1, wherein the load bearing formation comprises a flange, hook or recess.

14. An article according to claim 1, wherein all of the ceramic fibre layers are arranged in parallel with each other.

15. An assembly for an engine comprising:
    a metallic supporting structure; and
    an article mounted thereto by a load bearing formation in the article, wherein:
       the article comprises a ceramic matrix composite structure having a plurality of ceramic fibre layers, and a binder material interspersed throughout said layers, and
       the ceramic fibre layers undulate relative to one or more outer surfaces of the article, and the article further comprises a load bearing formation having a load bearing surface which intersects one or more of said layers such that a load applied to said surface, in use, is shared between a plurality of layers.

16. An assembly according to claim 15, wherein the layers extend through the article in the direction of a datum plane wherein the one or more outer surfaces of the article is aligned with said datum plane.

17. An assembly according to claim 15, wherein the undulating ceramic fibre layers extend through an entire width, length or depth dimension of the article.

18. An assembly according to claim 15 comprising a solid body consisting of said ceramic matrix composite structure.

19. An assembly according to claim 15 wherein the one or more outer surfaces are substantially planar in form.

20. An assembly according to claim 15 wherein the amplitude of the undulations is greater than or equal to the distance between adjacent layers.

21. An assembly according to claim 15 wherein the amplitude of the undulations is greater than or equal to the distance between a plurality of said layers.

22. An assembly according to claim 15 wherein the layers are substantially parallel in orientation and undulate in phase, and wherein a peak in the undulation of one layer extends between adjacent troughs in the undulation of at least one further layer.

23. An assembly according to claim 15, wherein the undulations repeat in a regular pattern through the article.

24. An assembly according to claim 15, wherein the layers undulate in two-dimensions.

25. An assembly according to claim 15, wherein an outer surface of the article intersects one or more layers at a plurality of locations over said surface.

26. An assembly according to claim 15, wherein the binder material comprises a sintered ceramic matrix material.

* * * * *